(12) United States Patent
Imagawa et al.

(10) Patent No.: US 8,547,809 B2
(45) Date of Patent: Oct. 1, 2013

(54) OPTICAL DISK DEVICE

(75) Inventors: Seiji Imagawa, Yokohama (JP); Yoshinori Ishikawa, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1155 days.

(21) Appl. No.: 12/477,538

(22) Filed: Jun. 3, 2009

(65) Prior Publication Data

US 2009/0296544 A1  Dec. 3, 2009

(30) Foreign Application Priority Data

Jun. 3, 2008 (JP) .................................. 2008-145261

(51) Int. Cl.
G11B 5/09 (2006.01)
G11B 5/58 (2006.01)
G11B 7/00 (2006.01)
G11B 15/00 (2006.01)

(52) U.S. Cl.
USPC ............. 369/47.14; 369/53.23; 369/53.28; 369/47.45; 369/53.35; 369/44.11; 369/44.14; 369/44.25; 369/44.29

(58) Field of Classification Search
USPC .......... 369/47.14, 53.23, 59.28, 47.45, 53.35, 369/44.11, 44.14, 44.25, 44.29
See application file for complete search history.

(56) References Cited

U.S. PATENT DOCUMENTS

| 4,866,688 | A  | * | 9/1989 | Ohtake et al. ............... 369/44.13 |
| 2001/0006493 | A1 | * | 7/2001 | Ikeda et al. ..................... 369/13 |
| 2002/0136105 | A1 | * | 9/2002 | Chan .......................... 369/44.26 |
| 2003/0026175 | A1 | * | 2/2003 | Otsuka et al. ............... 369/44.13 |
| 2007/0030773 | A1 | * | 2/2007 | Kuroda et al. .............. 369/44.31 |
| 2007/0274166 | A1 | * | 11/2007 | Imagawa ........................ 369/43 |

FOREIGN PATENT DOCUMENTS

| JP | 08-030990 | 2/1996 |
| JP | 2001-344773 | 12/2001 |
| JP | 2003-173551 | 6/2003 |
| JP | 2005-174389 | 6/2005 |

* cited by examiner

*Primary Examiner* — Aneeta Yodichkas
(74) *Attorney, Agent, or Firm* — McDermott Will & Emery LLP (57) ABSTRACT

There is a need to prevent a possible erroneous detection of an off-track condition during recording to an optical disk. The above need can be addressed by, for example, determining an off-track condition has occurred when a light spot is located at least half-way from the track being recorded toward another track adjacent the track being recorded, and stopping a recording operation. In another example, the above need can be addressed by determining that off-track has occurred based on an output of a first off-track detector which detects that the light spot is off the track based on a wobble signal, an output of a second off-track detector which detects that the light spot is off the track based on a tracking error signal, and an output of a zero-cross detector which detects that the tracking error signal crosses zero based on an output of the tracking error signal.

5 Claims, 6 Drawing Sheets

OPTICAL DISK DEVICE

BACKGROUND

The present examples relate to an optical disk device and, more specifically, to an off-servo detection method for use during recording.

The background technologies in this field include those in JP-A-2001-344773, JP-A-8-30990, JP-A-2003-173551, and others. In these publications, an off-track-servo determination is made using the signal amplitude of a tracking error signal.

As another background technology, there is JP-A-2005-174389, for example. This publication describes a problem in that "a modulating signal of a sum-total signal cannot be detected, and this resultantly increases the difficulty in measuring the phase difference from a tracking error signal, thereby failing to determine a direction of the beam movement." As means for solving the problem, there is a description that "provided are push-pull signal generation means for generating a push-pull signal, and on-track/off-track signal generation means for generating an on-track/off-track signal that determines the on-track/off-track state of a light spot based on a wobble frequency signal component that is superimposed on the push-pull signal to be derived when the light spot is moved by movement means."

There is room for further improvement in techniques for detection of an off-track-servo condition during recording to a disk, by an optical disk device.

SUMMARY

As described in the foregoing, with the method for stopping recording when a light spot is detected as being off the track that is in progress of recording using a tracking error signal or address continuity, overwriting of already-recorded data can be prevented.

The problem with such a method for off-track detection based on the address discontinuity is that the address discontinuity cannot be checked until address reading is started after the light spot becomes actually off the track, and data overwriting may be started therebefore.

Moreover, as the method for off-track detection using the tracking error signal, generally used is a method for determining that an off-track condition has occurred when the signal level of the tracking error signal becomes larger than a predetermined threshold value. In this case, the threshold value is required to be smaller in value than the amplitude of the tracking error signal considering that the amplitude of the tracking error signal varies depending on the state of a disk or a device, thereby resulting in a difficulty in detecting off-track without fail. That is, even when off-track is not actually occurring, the determination may be possibly made as off-track being occurred when the level of the tracking error signal exceeds the threshold value.

Moreover, in JP-A-2005-174389, a wobble signal is used to determine the direction of the beam movement, but there is no description about detection of off-track using the wobble. Furthermore, no consideration is given to any possible off-track during recording.

Hence, there is a need to prevent a possible erroneous detection of an off-track condition during recording to an optical disk.

The above need can be addressed by, for example, determining an off-track condition has occurred when a light spot is located at least half-way from the track being recorded toward another adjacent track, and stopping a recording operation.

In another example, the above need can be addressed by determining that off-track has occurred based on an output of a first off-track detector which detects that the light spot is off the track based on a wobble signal, an output of a second off-track detector which detects that the light spot is off the track based on a tracking error signal, and an output of a zero-cross detector which detects that the tracking error signal crosses zero based on an output of the tracking error signal.

According to the present examples, a possible erroneous detection of off-track can be prevented.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
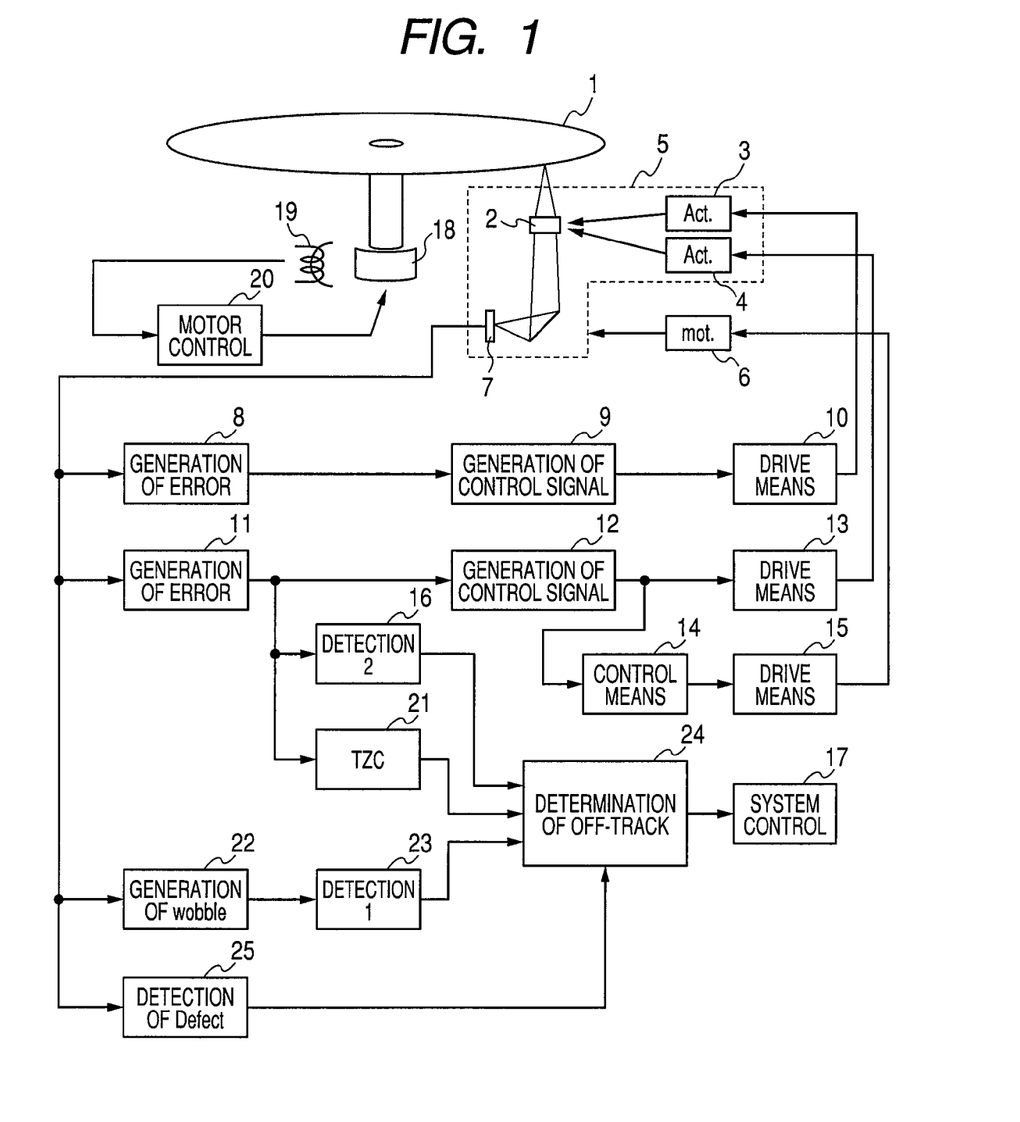
FIG. 1 is a diagram showing components in a first example.
Figure 2:
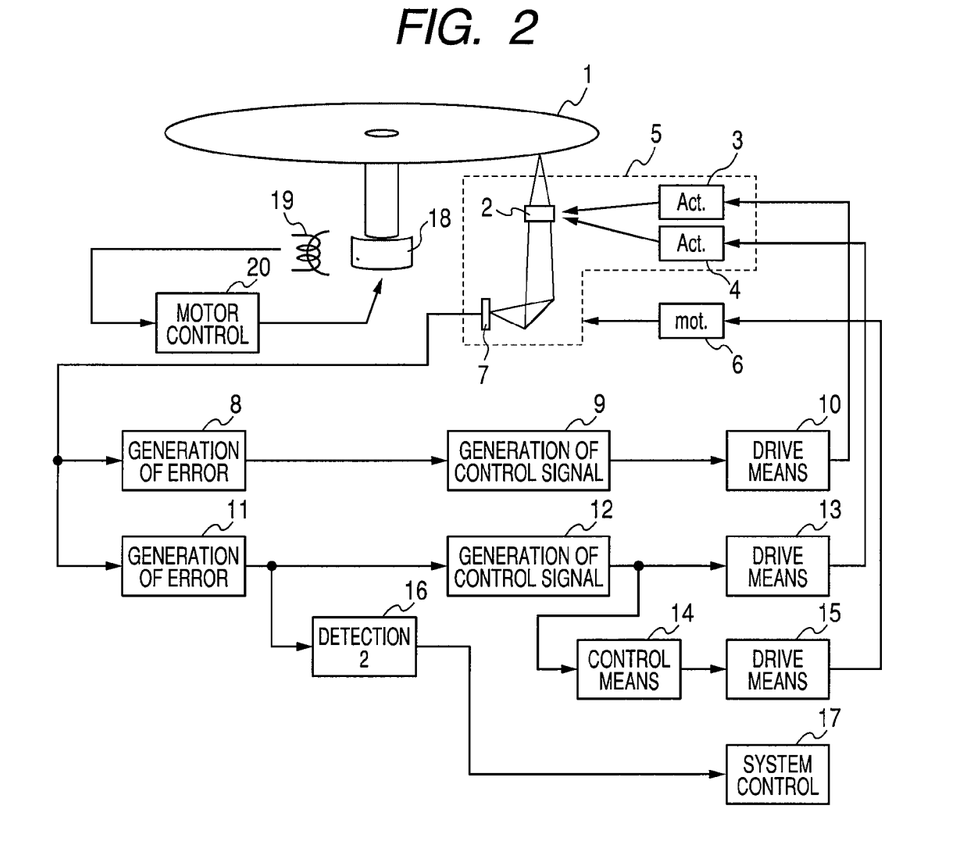
FIG. 2 is a diagram showing components in a previous example.

FIG. 1 depicts an optical disk device additionally provided with elements performing several of functions involved in the present off-track detection teachings, as compared with FIG. 2 which is describing the previous off-track detection method. First of all, FIG. 2 is referred to for describing the previous off-track detection method, and then an off-track detection method in this example is described with reference to FIG. 1.

In FIG. 2, 1 denotes a disk, 2 denotes an objective lens, 3 denotes a focus actuator that drives the objective lens in the direction of a disk rotary shaft, 4 denotes a tracking actuator that drives the objective lens in the direction of a disk radius, 5 denotes an optical pickup unit, 6 is a seek motor that drives the optical pickup unit in the direction of the disk radius, 7 denotes an optical detector, 8 denotes focus error signal generation means that generates an error signal between the disk and the objective lens in a focus direction, 9 denotes focus control signal generation means that controls the focus actuator in such a manner as to position a light spot on a disk recording surface or a reproduction surface, 10 denotes focus actuator drive means that drives the focus actuator, 11 denotes tracking error signal generation means that generates an error signal between the track of the disk and the objective lens in a tracking direction, 12 denotes tracking control signal generation means that controls the tracking actuator in such a manner as to position a light spot at a predetermined track of the disk, 13 denotes tracking actuator drive means that drives the tracking actuator, 14 denotes seek motor control means that controls a seek motor, 15 denotes seek motor drive means that drives the seek motor, 16 denotes off-track detection means, 17 denotes system control means that manages the state of the device and the recording and reproduction operation thereof, 18 denotes a spindle motor that rotates the disk, 19 denotes frequency generation means that generates a signal in accordance with the rotation speed of the spindle motor, and 20 denotes motor control means that controls the spindle motor so as to rotate at the predetermined speed.

Described next is the brief summary of the operation of each block, and the relationship among the blocks. In FIG. 2, the focus actuator 3 moves the objective lens 2 in the direction of a disk rotary shaft, and the tracking actuator 4 moves the objective lens 2 in the direction of a disk radius. The seek motor 6 moves the optical pickup unit 5 in the direction of the disk radius. The optical detector 7 converts a reflected light into an electric signal, and then forwards the resulting converted signal to both the focus error signal generation means 8 and the tracking error signal detection means 11. Based on thus provided signal, the focus error signal generation means 8 generates a focus error signal, and forwards the resulting generated signal to the focus control signal generation means 9. Based on the signal provided by the focus error signal generation means 8, the focus control signal generation means 9 generates a focus control signal, and forwards the resulting generated signal to the focus actuator drive means 10. Based on thus provided signal, the focus actuator drive means 10 drives the focus actuator 3. Based on thus provided signal, the tracking error signal generation means 11 generates a tracking error signal, and forwards the resulting generated signal to both the tracking control signal generation means 12 and the off-track detection means 16. Based on the signal provided by the tracking error signal generation means 11, the tracking control signal generation means 12 generates a tracking control signal, and forwards the resulting generated signal to both the tracking actuator drive means 13 and the seek motor control means 14. Based on thus provided signal, the tracking actuator drive means 13 drives the tracking actuator 4. Based on the signal provided by the tracking control signal generation means 12, the seek motor control means 14 generates a seek motor control signal, and forwards the resulting generated signal to the seek motor drive means 15. Based on thus provided signal, the seek motor drive means 15 drives the seek motor 6. Based on the signal provided by the tracking error signal generation means 11, the off-track detection means 16 detects any off-track, and forwards the resulting detected signal to the system control means 17. Based on the signal provided by the off-track detection means 16, the system control means 17 stops the recording operation. The spindle motor 18 drives the disk 1. The frequency generation means 19 converts information about the rotation speed of the spindle motor 18 into an electric signal, and forwards the resulting converted signal to the motor control means 20. Based on thus provided signal, the motor control means 20 controls the spindle motor 18 in such a manner that the disk 1 is rotated at a predetermined rotation speed.

Figure 3:
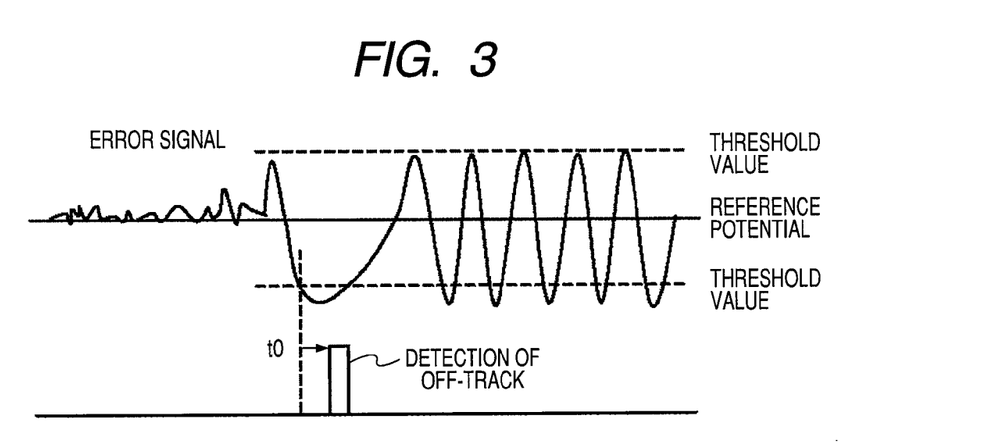
FIG. 3 is a diagram showing a previous off-track detection method.
Figure 4:
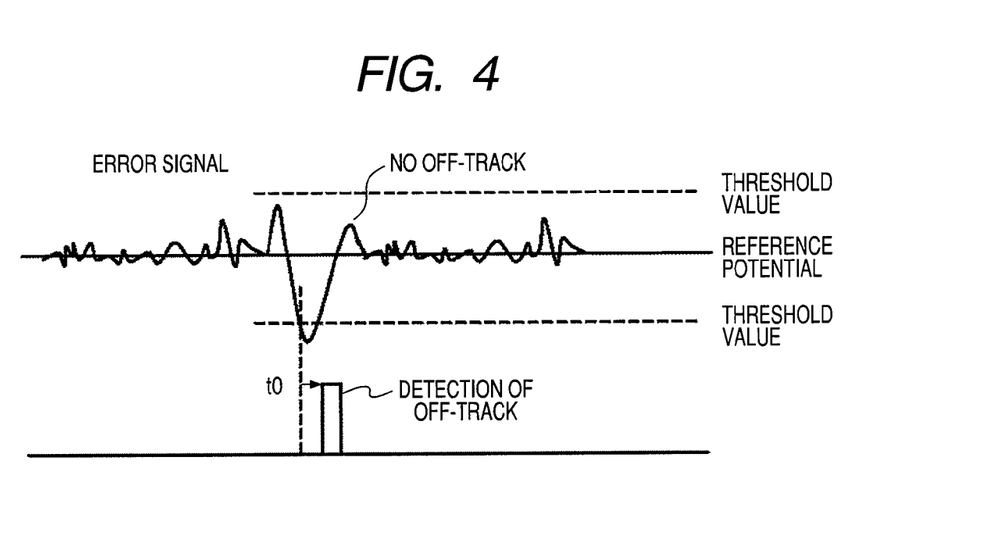
FIG. 4 is a diagram showing problems of the previous off-track detection method.

Described next is the operation of the off-track detection means 16 by referring to FIG. 3. The off-track detection means 16 compares the signal provided by the tracking error signal generation means 11 with a predetermined threshold value, and when the signal exceeds the threshold value, and after a lapse of a predetermined length of time t0, outputs Hi. The threshold value is ideally substantially the amplitude level of the tracking error signal, but the amplitude of the tracking error signal varies as is dependent on the state of the device such as disk reflection ratio, and amount of tilt and defocus, for example. As such, considering such a possible variation of the amplitude, there needs to perform value setting to enable off-track detection even in the state when the amplitude is reduced. Therefore, as shown in FIG. 4, even with no actual off-track, it may be detected as off-track being occurred in some cases.

As described above, the method for off-track detection using only the tracking error signal may cause erroneous error due to a threshold value. In consideration thereof, in the example of FIG. 1, the device operates as below so that no erroneous detection is caused, and any off-track can be detected without fail.

By referring to FIG. 1, the example is described. FIG. 1 includes track zero-cross detection means 21, wobble generation means 22, off-track detection means 23, and off-track determination means 24. The remaining means are the same as those in FIG. 2, and thus are not described again.

Described next is the brief summary of the operation of each block, and the relationship among the blocks. Based on a signal provided by the optical detector 7, the tracking error signal generation means 11 generates a tracking error signal, and forwards the resulting generated signal to all the tracking control signal generation means 12, the off-track detection means 16, and the track zero-cross detection means 21. As described above, the off-track detection means 16 detects any off-track from the amplitude of the tracking error signal, and forwards the result of the detection as a Hi/Lo signal to the off-track determination means 24. When the tracking error signal is higher than a reference potential, the track zero-cross detection means 21 outputs Hi, and outputs Lo when the signal is lower than the reference potential. The resulting output signal is input to the off-track determination means 24. Based on the signal provided by the optical detector 7, the wobble generation means 22 generates a wobble signal, and forwards the resulting generated wobble signal to the off-track detection means 23. Based on thus provided signal, the off-track detection means 23 detects any off-track, and forwards the resulting detected signal to the off-track determination means 24. Based on the signals respectively provided by the off-track detection means 16, the track zero-cross detection means 21, and the off-track detection means 23, the off-track determination means 24 determines whether off-track is being occurred, and forwards the resulting determination signal to the system control means 17. Based on the signal provided by the off-track determination means 24, the system control means 17 stops the recording operation. The remaining brief summary of the operation of each block and the relationship among the blocks are the same as those in FIG. 2, and thus are not described again.

Figure 5:
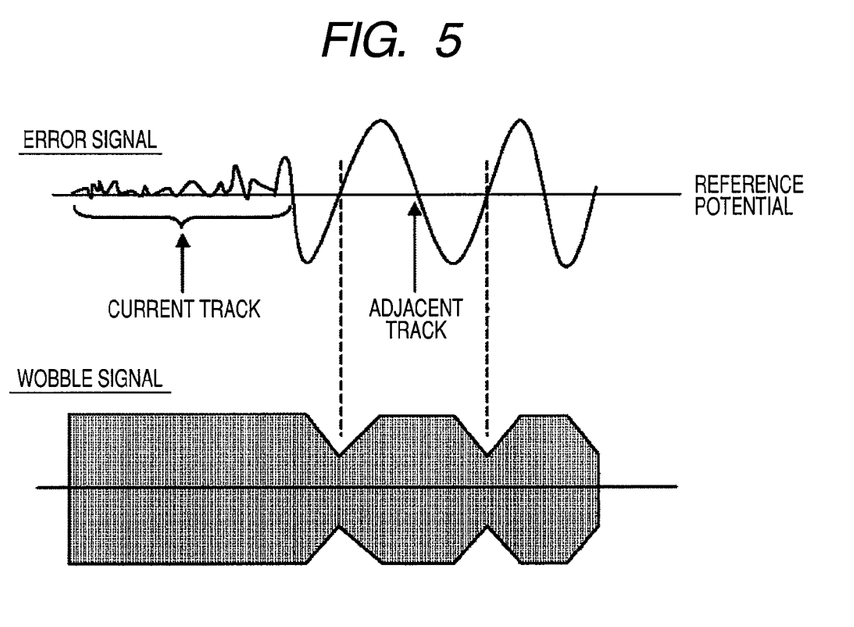
FIG. 5 is a conceptual view of a wobble signal at the time of occurrence of off-track.
Figure 6:
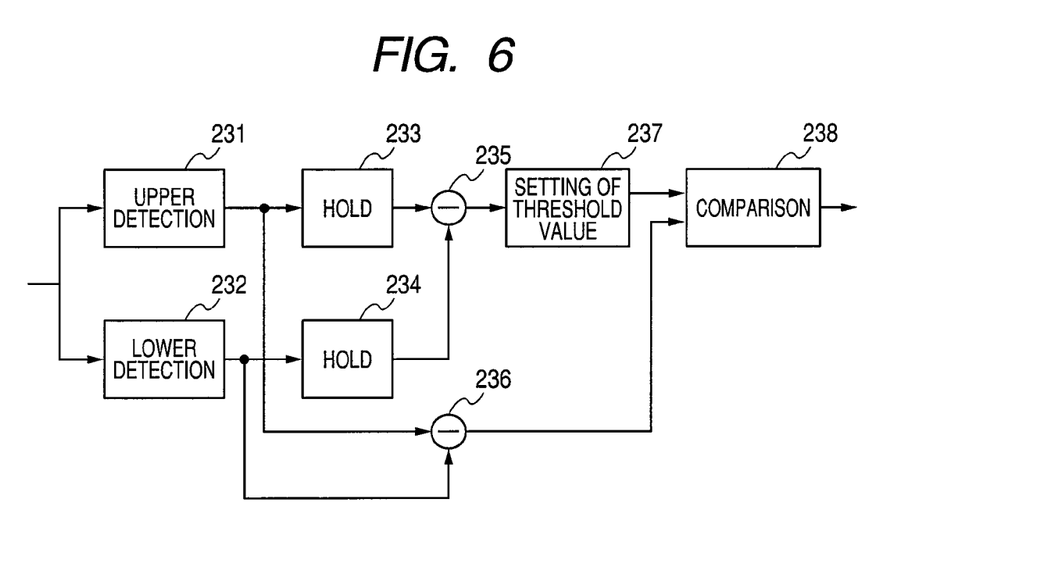
FIG. 6 is a diagram showing components for an off-track detection method in the first example.

Described next are the operation of the wobble generation means 22, and that of the off-track detection means 23. FIG. 5 is a conceptual view of a wobble signal, and the wobble generation means 22 generates such a wobble signal as shown in FIG. 5 using a signal provided by the optical detector 7. When a light spot is located at any correct track position, the wobble signal can be of a predetermined amplitude, but will be lower in amplitude when the light spot is located between one track and another. The off-track detection means 23 detects such a reduction of the amplitude of the wobble signal. By referring to FIG. 6, the operation of the off-track detection means 23 is described. First of all, a wobble signal provided by the wobble generation means 22 is subjected to detection by upper envelope detection means 231 and lower envelope detection means 232, and the resulting detection signals are respectively forwarded to hold means 233 and 234, and also to subtraction means 236. The hold means 233 and 234 respectively hold an upper envelope signal and a lower envelope signal, and subject these hold signals to subtraction in the subtraction means 235. Threshold generation means 237 generates a threshold signal for use to detect any reduction of the amplitude of the wobble signal from the signal being a result from the subtraction means 235. Comparison means 238 compares the threshold signal provided by the threshold generation means 237 and a signal provided by the subtraction means 236, and detects any signal reduction of the wobble signal.

Figure 7:
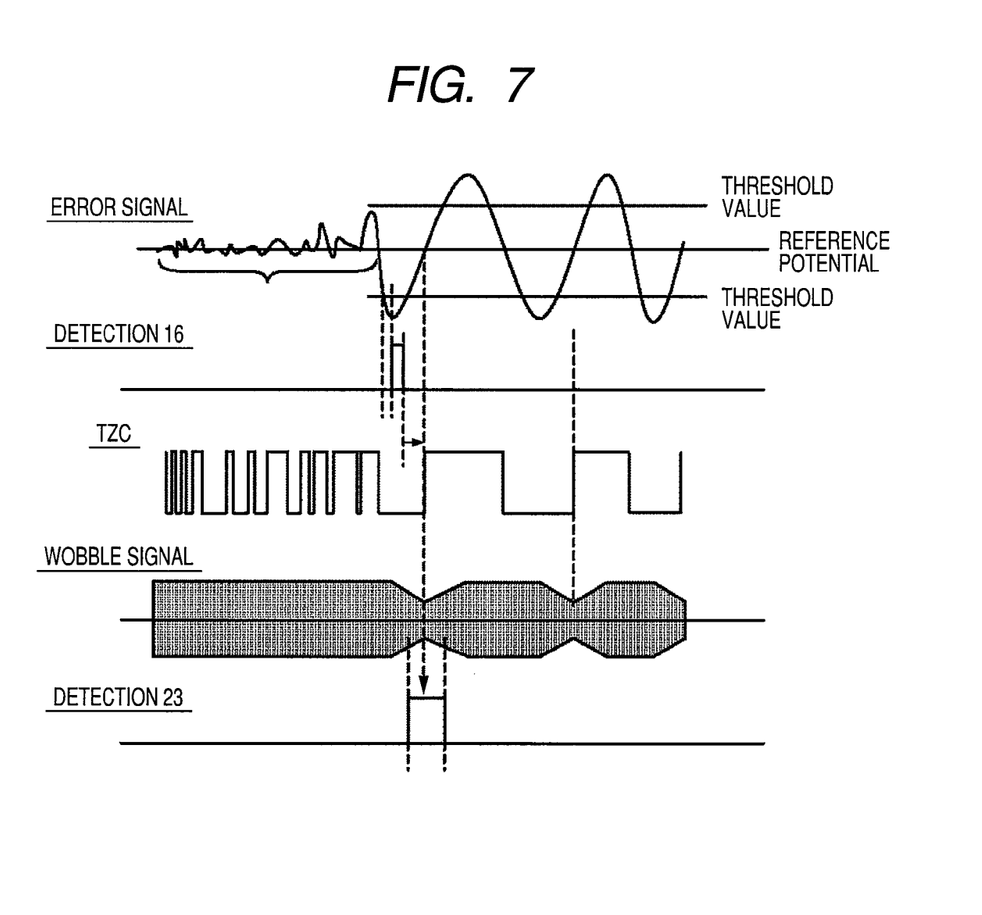
FIG. 7 is a diagram showing the operation of the off-track detection method in the first example.

Described next is the off-track determination means 24. FIG. 7 shows a tracking error signal, an output of the off-track detection means 16 being an input signal of the off-track determination means 24, an output of the track zero-cross detection means 21, and an output of the off-track detection means 23. When the tracking error signal exceeds a predetermined threshold value, the off-track determination means 24 detects a Hi signal from the off-track detection means 16. After the Hi signal is detected as such, the output of the off-track detection means 23 is detected at a rising or falling edge timing of a track zero-cross signal that is detected for the first time. At this time, when the output of the off-track detection means 23 is Hi, a light spot is determined as being off the track, and when the output of the off-track detection means 23 is Lo, the light spot is determined as not being off the track.

The off-track determination means 24 also can make an off-track determination B using only an output of the off-track detection means 16, and operates with a change from a determination A using the output of the off-track detection means 16, that of the track zero-cross detection means 21, and that of the off-track detection means 23. That is, when user data in a disk is being recorded, the method with the determination A is used, and when file management information is being recorded, the method with the determination B is used. Even when the user area is being recorded, if with any off-track to the side of the outer of the disk, the method with the determination A may be used, and if with any off-track to the side of the inner radius of the disk, the method with the determination B may be used. If this is the case, to which side the off-track is occurring, i.e., the inner radius or the outer of the disk, can be detected by detecting which of a positive-side threshold value or a negative-side threshold value the tracking error signal exceeds. The off-track detection means 16 forwards, to the off-track determination means 24, not only the signal detecting the off-track but also information about with which of the positive-side and negative-side threshold values the off-track is detected. When the off-track detection means 16 detects the off-track using one of the threshold values, the off-track determination means 24 determines that it is the off-track at the timing, and when the off-track detection means detects the off-track using the remaining threshold value, determines that it is the off-track through detection of the output of the off-track detection means 23 at the edge timing of the track zero-cross.

Figure 8:
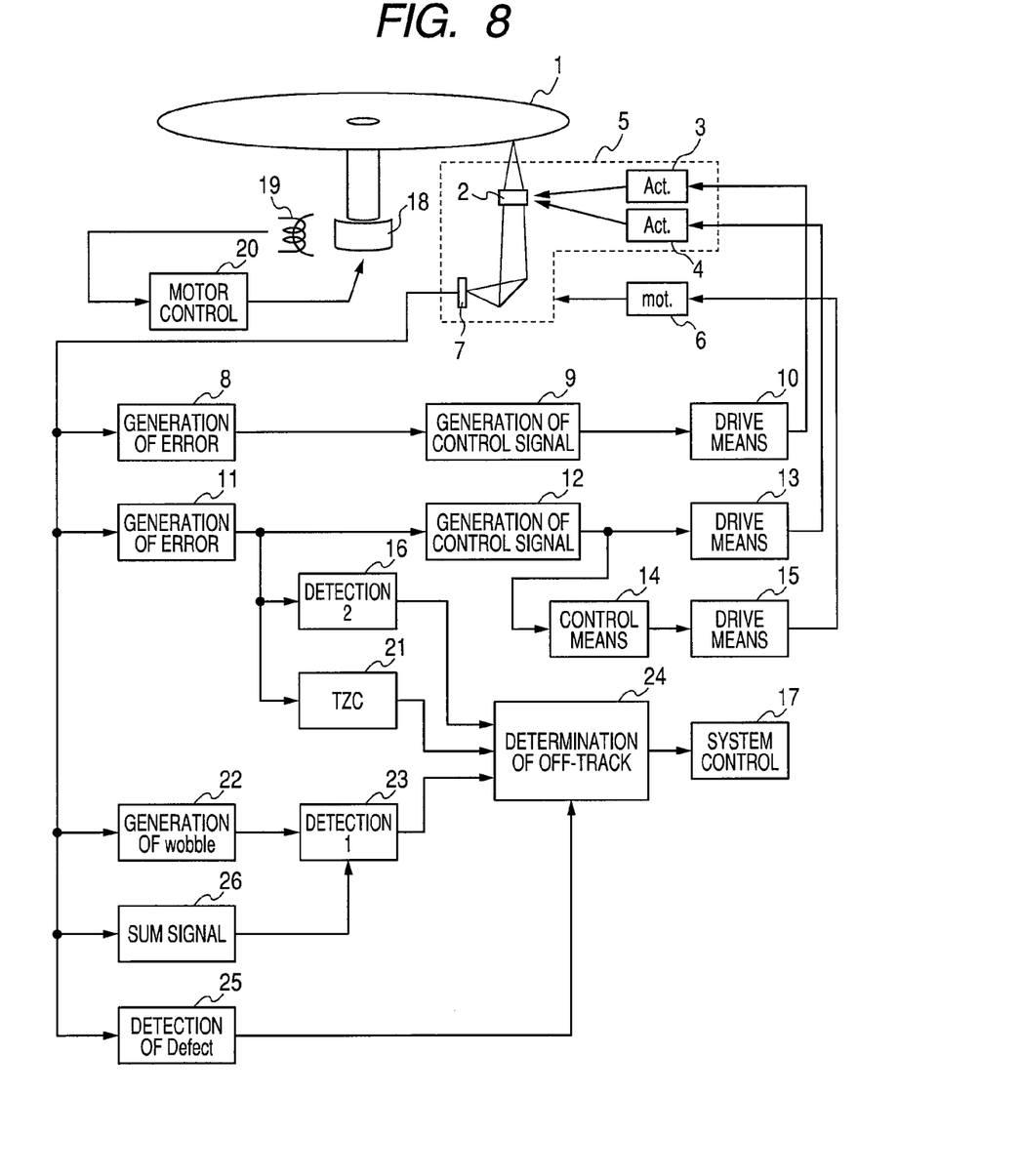
FIG. 8 is a second diagram showing the components in the first example.

Moreover, immediately after the start of the recording, the amplitude of the wobble signal may be different from that during reproduction, and if this is the case, the off-track detection means 16 cannot detect any off-track with accuracy. This is because, with a change of the amplitude of the wobble signal, the wobble envelope signal shows a rapid change but the hold signal remains with a predetermined time constant. For solving such a problem, alternatively, the off-track determination means 24 may make an off-track determination using the method with the above-described determination B until a lapse of a predetermined time immediately after the start of the recording, and after the lapse of the predetermined time, may make an off-track determination using the method with the determination A. Still alternatively, immediately after the start of the recording, the envelope signal hold means may be operated to instantaneously follow any change of the amplitude of the wobble signal through resetting thereof or by changing the time constant thereof. Still alternatively, the problem described above can be solved by sum signal generation means 26 that generates a sum-total signal of the reflected light coming from the optical detector 7 as shown in FIG. 8. That is, based on the sum-total signal provided by the sum signal generation means 26, the off-track detection means 23 normalizes the wobble signal so that the amplitude of the wobble signal can remain the same during recording and reproduction, and an off-track determination can be made using the method with the determination A immediately after the start of the recording.

Moreover, when any scratch or stain is observed on the disk, the amplitude of the wobble signal shows a change, and thus the off-track detection means 16 cannot detect any off-track with accuracy. If this is the case, the problem described above can be solved by defect signal generation means 25 that generates a defect signal based on the reflected light coming from the optical detector 7 as shown in FIG. 8. That is, based on the defect signal provided by the defect signal generation means 25, the off-track determination means 24 can make an off-track determination using the method with the determination B during defect detection, and using the method with the determination A during no defect detection.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An optical disk device using a pickup, comprising:
 a focus actuator that drives an objective lens in a direction of a disk rotary shaft;
 a tracking actuator that drives the objective lens in a direction of a disk radius;
 a detector that converts light reflected from the disk into an electric signal;
 a focus error signal generator which generates a focus error signal based on an output of the detector that converts disk reflected light into the electric signal;

a tracking error signal generator which generates a tracking error signal based on the output of the detector that converts the disk reflected light into the electric signal;
a focus actuator controller which controls the focus actuator;
a tracking actuator controller which controls the tracking actuator;
an off-track determination circuit which determines if an off-track condition has occurred, in case a light spot is located around the halfway point between the track being recorded and another track adjacent the track being recorded and in case the tracking error signal crosses a reference level, and controls a recording operation;
a wobble signal generator which generates a wobble signal based on the output of the detector that converts the disk reflected light into the electric signal;
a first off-track detector which detects that the light spot is off the track based on an output of the wobble signal generator;
a zero-cross detector which detects that the tracking error signal crosses zero based on an output of the tracking error signal generator; and
a second off-track detector which detects that the light spot is off the track based on the output of the tracking error signal generator,
wherein whether the tracking error signal crosses the reference level is determined based on an output of the tracking error signal generator; and
wherein the off-track determination circuit controls the recording operation based on an output of the first off-track detector, an output of the second off-track detector, and an output of the zero-cross detector.

2. An optical disk device using a pickup, comprising:
a focus actuator that drives an objective lens in a direction of a disk rotary shaft;
a tracking actuator that drives the objective lens in a direction of a disk radius;
a detector that converts light reflected from the disk into an electric signal;
a focus error signal generator which generates a focus error signal based on an output of the detector that converts disk reflected light into the electric signal;
a tracking error signal generator which generates a tracking error signal based on the output of the detector that converts the disk reflected light into the electric signal;
a focus actuator controller which controls the focus actuator;
a tracking actuator controller which controls the tracking actuator;
an off-track determination circuit which determines if an off-track condition has occurred, in case a light spot is located around the halfway point between the track being recorded and another track adjacent the track being recorded and in case the tracking error signal crosses a reference level, and controls a recording operation;
a wobble signal generator which generates a wobble signal based on the output of the detector that converts the disk reflected light into the electric signal;
a first off-track detector which detects that the light spot is off the track based on the wobble signal generator;
a zero-cross detector which detects that the tracking error signal crosses reference level based on an output of the tracking error signal generator; and
a second off-track detector which detects that the light spot is off the track based on the output of the tracking error signal generator,
wherein whether the tracking error signal crosses the reference level is determined based on an output of the tracking error signal generator, and
wherein when the light spot is off the track in a direction toward an outer portion of the disk, the off-track determination circuit controls the recording operation based on an output of the first off-track detector, an output of the zero-cross detector, and an output of the second off-track detector, and controls the recording operation based on the output of the second off-track detector when the light spot is off the track in a direction of a disk inner radius.

3. An optical disk device using a pickup, comprising:
a focus actuator that drives an objective lens in a direction of a disk rotary shaft;
a tracking actuator that drives the objective lens in a direction of a disk radius;
a detector that converts light reflected from the disk into an electric signal;
a focus error signal generator which generates a focus error signal based on an output of the detector that converts disk reflected light into the electric signal;
a tracking error signal generator which generates a tracking error signal based on the output of the detector that converts the disk reflected light into the electric signal;
a focus actuator controller which controls the focus actuator;
a tracking actuator controller which controls the tracking actuator;
an off-track determination circuit which determines if an off-track condition has occurred, in case a light spot is located around the halfway point between the track being recorded and another track adjacent the track being recorded and in case the tracking error signal crosses a reference level, and controls a recording operation;
a wobble signal generator which generates a wobble signal based on the output of the detector that converts the disk reflected light into the electric signal;
a first off-track detector which detects that the light spot is off the track based on the wobble signal generator;
a zero-cross detector which detects that the tracking error signal crosses reference level based on an output of the tracking error signal generator; and
a second off-track detector which detects that the light spot is off the track based on the output of the tracking error signal generator,
wherein whether the tracking error signal crosses the reference level is determined based on an output of the tracking error signal generator,
wherein the off-track determination circuit controls the recording operation when the light spot is off the track during the recording operation in a user area based on an output of the first off-track detector, an output of the zero-cross detector, and an output of the second off-track detector, and when the light spot is off the track during the recording operation in an area other than the user area, controls the recording operation based on the output of the second off-track detector.

4. An optical disk device using a pickup, comprising:
a focus actuator that drives an objective lens in a direction of a disk rotary shaft;
a tracking actuator that drives the objective lens in a direction of a disk radius;

a detector that converts light reflected from the disk into an electric signal;

a focus error signal generator which generates a focus error signal based on an output of the detector that converts disk reflected light into the electric signal;

a tracking error signal generator which generates a tracking error signal based on the output of the detector that converts the disk reflected light into the electric signal;

a focus actuator controller which controls the focus actuator;

a tracking actuator controller which controls the tracking actuator;

an off-track determination circuit which determines if an off-track condition has occurred, in case a light spot is located around the halfway point between the track being recorded and another track adjacent the track being recorded and in case the tracking error signal crosses a reference level, and controls a recording operation;

a wobble signal generator which generates a wobble signal based on the output of the detector that converts the disk reflected light into the electric signal;

a first off-track detector which detects that the light spot is off the track based on the wobble signal generator;

a zero-cross detector which detects that the tracking error signal crosses reference level based on an output of the tracking error signal generator; and a second off-track detector which detects that the light spot is off the track based on the output of the tracking error signal generator, wherein whether the tracking error signal crosses the reference level is determined based on an output of the tracking error signal generator, and wherein the off-track determination circuit controls the recording operation based on the second off-track detector for a predetermined length of time after start of recording, and after a lapse of the predetermined length of time after the start of recording, controls the recording operation based on an output of the first off-track detector, an output of the zero-cross detector, and an output of the second off-track detector.

5. An optical disk device using a pickup, comprising:

a focus actuator that drives an objective lens in a direction of a disk rotary shaft;

a tracking actuator that drives the objective lens in a direction of a disk radius;

a detector that converts light reflected from the disk into an electric signal;

a focus error signal generator which generates a focus error signal based on an output of the detector that converts disk reflected light into the electric signal;

a tracking error signal generator which generates a tracking error signal based on the output of the detector that converts the disk reflected light into the electric signal;

a focus actuator controller which controls the focus actuator;

a tracking actuator controller which controls the tracking actuator;

an off-track determination circuit which determines if an off-track condition has occurred, in case a light spot is located around the halfway point between the track being recorded and another track adjacent the track being recorded and in case the tracking error signal crosses a reference level, and controls a recording operation;

a wobble signal generator which generates a wobble signal based on the output of the detector that converts the disk reflected light into the electric signal;

a first off-track detector which detects that the light spot is off the track based on the wobble signal generator;

a zero-cross detector which detects that the tracking error signal crosses reference level based on an output of the tracking error signal generator;

a second off-track detector which detects that the light spot is off the track based on the output of the tracking error signal generator; and a defect detector which detects scratch and strain of a disk, wherein whether the tracking error signal crosses the reference level is determined based on an output of the tracking error signal generator, and wherein the off-track determination circuit controls the recording operation based on an output of the defect detector and based on an output of the second off-track detector during a defect detection period, and controls the recording operation based on an output of the first off-track detector, an output of the zero-cross detector, and an output of the second off-track detector in a period not during scratch detection.

* * * * *